United States Patent [19]

Boné

[11] 4,169,317
[45] Oct. 2, 1979

[54] PRECISION ELECTRICAL CALIPERS

[76] Inventor: Miroslav B. Boné, 11457 60th Terrace North, Seminole, Fla. 33542

[21] Appl. No.: 941,476

[22] Filed: Sep. 12, 1978

[51] Int. Cl.² .............................................. G01B 7/02
[52] U.S. Cl. ................................................ 33/148 H
[58] Field of Search .............. 33/149 J, 148 H, 143 L, 33/147 N, 172 E, 174 L, 174 R, 174 E, 174 P

[56] References Cited

U.S. PATENT DOCUMENTS

| | | | |
|---|---|---|---|
| 1,816,464 | 7/1931 | Biggert | 33/149 J |
| 2,217,509 | 10/1940 | Bryant | 33/166 X |
| 2,401,962 | 6/1946 | Reynolds | 33/149 J |
| 2,943,394 | 7/1960 | Schabot | 33/147 K |

Primary Examiner—Harry N. Haroian
Attorney, Agent, or Firm—B. P. Fishburne, Jr.

[57] ABSTRACT

For measuring machined recesses having angled side walls with high accuracy and for measuring narrow grooves machined in workpieces, caliper legs are equipped interchangeably with contact ball extremities and narrow right angular leg extensions for use in measuring machined grooves. An interior workpiece contact pin electrically insulated from the contact ball extremity is electrically connected through a leg of the calipers with a first light emitting diode, while the contact ball extremity is similarly electrically connected with a second light emitting diode. The other leg of the calipers may constitute an electrical ground. A machinist user of the device endeavors to light both light emitting diodes by bringing the ball extremities into tangent contact with machined recess side walls while the interior contact pin is engaged with the bottom of the recess. In a different embodiment of the device, four diodes must be illuminated to assure the correct measurement. A positive and precise operating mechanism for the pivoted caliper legs is provided.

13 Claims, 9 Drawing Figures

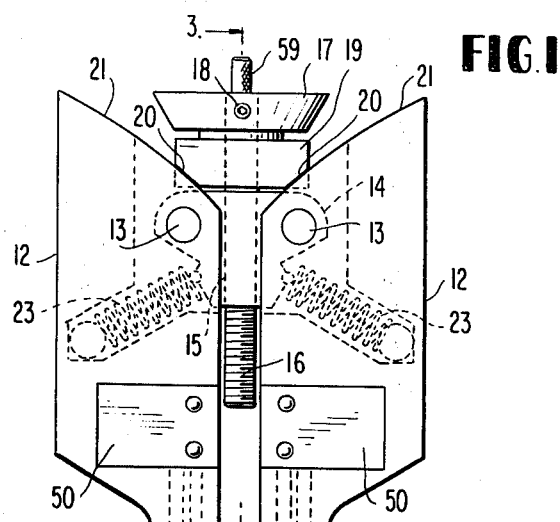

PRECISION ELECTRICAL CALIPERS

BACKGROUND OF THE INVENTION

The machining of recesses having angled side walls in metal workpieces to close dimensional tolerances is a practical nightmare to machinists and tool and die makers using present-day measuring devices. For example, a machinist may be required to machine a cavity 0.500 inch deep with a side wall rising at a 45° angle from a flat bottom wall of the cavity to a dimension or diameter of, say, 5 inches ± 0.001 inch across the inside corners of the cavity. This tolerance is extremely difficult to obtain using conventional measuring tools.

As the workpiece is taken from the machine, with the machinist's great hope that the dimensions of the cavity are correct to specification, the piece is then taken to the inspection room and placed on a $30,000 to $40,000 comparator to check the critical dimension. The machinist soon learns, in a practical case, that he is 0.003 or 0.005 over or under the required dimension. If the cavity diameter or width is undersized, he will simply place it back in the machine, indicate carefully within 0.0005 inch an attempt to machine 0.003 or 0.005 inch off of the angled side wall and then start the whole measuring procedure over again. If the cavity proved to be oversized, the machinist will be compelled to start all over again with a new workpiece. This hit-and-miss machining and measuring procedure is very time-consuming, inconvenient and generally inefficient and costly.

An alternate procedure is available in the prior art, probably a bit more satisfactory than the above. In the alternate procedure, the machinist will first make a male plug to the shape and size of the cavity. He will then try to machine the required cavity in the workpiece until the male plug fits exactly all around the cavity side wall and on the bottom. This of course is a lengthy, tedious and expensive procedure.

The invention has for its objective to completely eliminate the above problem or difficulty involved in the precision machining of cavities having angled side walls in workpieces, regardless of whether the side wall angle is open or inverted in the workpiece. The device of the invention also possesses the ability to gage or measure with high accuracy the depth of narrow machined grooves, both internal and external.

The objective of the invention is realized by providing a caliper-type measuring device having an efficient leg spreading and retracting mechanism and with the legs of the instrument equipped with readily interchangeable ball elements for measuring machined recesses and narrow right angular elements for use in measuring narrow machined grooves.

More particularly, the caliper measuring device utilizes electrical sensing or contact elements on one or both legs thereof electrically connected through such leg or legs with light emitting elements conveniently housed within compartments formed in the two legs of the device. In the embodiment of the invention used to make a precision measurement between the side walls of a machined recess, an interior central contact pin is engaged electrically with the bottom of a machined cavity while a surrounding exterior ball contact element is brought into tangent contact with the angled side wall of the cavity. The opposite leg of the caliper device may then serve as a ground for the device. In an alternate arrangement, the caliper device is grounded through a separate strap element and both legs are equipped with the electrical sensing elements which must be properly located with respect to the cavity surfaces to light up four light emitters simultaneously to assure the proper measurement.

The proper use of the invention assures high precision in the measurement of machined cavities and grooves. When the light emitters are energized, there is no doubt or guesswork on the part of the machinist. The electrical sensing contacts are far more sensitive than the human hands. By the use of the invention, a critical cavity measurement can easily be obtained within a tolerance of 0.0002 inch. Even where batteries are dead or diodes burned out, the device can still be used effectively by applying spotting blue on opposite sides of the adjustable ball element. By moving the ball element left and right across the center and touching the blued section, lines will appear on the bottom of the cavity and side wall. When these lines are one above the other, the desired measurement is achieved.

Some efforts have been made in the prior art to devise electrified calipers but none of these efforts has resulted in providing a device which even approaches the precision capabilities of the present invention. The following prior U.S. Pat. Nos. represent the known prior art and are made of record herein under 37 C.F.R. 1.56, duty to disclose: 611,391; 1,816,464; 2,401,962; 2,445,068.

BRIEF DESCRIPTION OF THE DRAWINGS

FIG. 1 is a side elevation of a caliper measuring device according to one embodiment of the invention with the caliper legs retracted into parallel relationship.

FIG. 2 is a fragmentary central vertical section through the leg spreading and retracting means with the legs spread apart.

FIG. 3 is a central vertical section taken on line 3—3 of FIG. 1.

FIG. 4 is an enlarged fragmentary vertical section taken on line 4—4 of FIG. 1.

FIG. 5 is a similar section taken on line 5—5 of FIG. 4.

DETAILED DESCRIPTION

Figure 6:
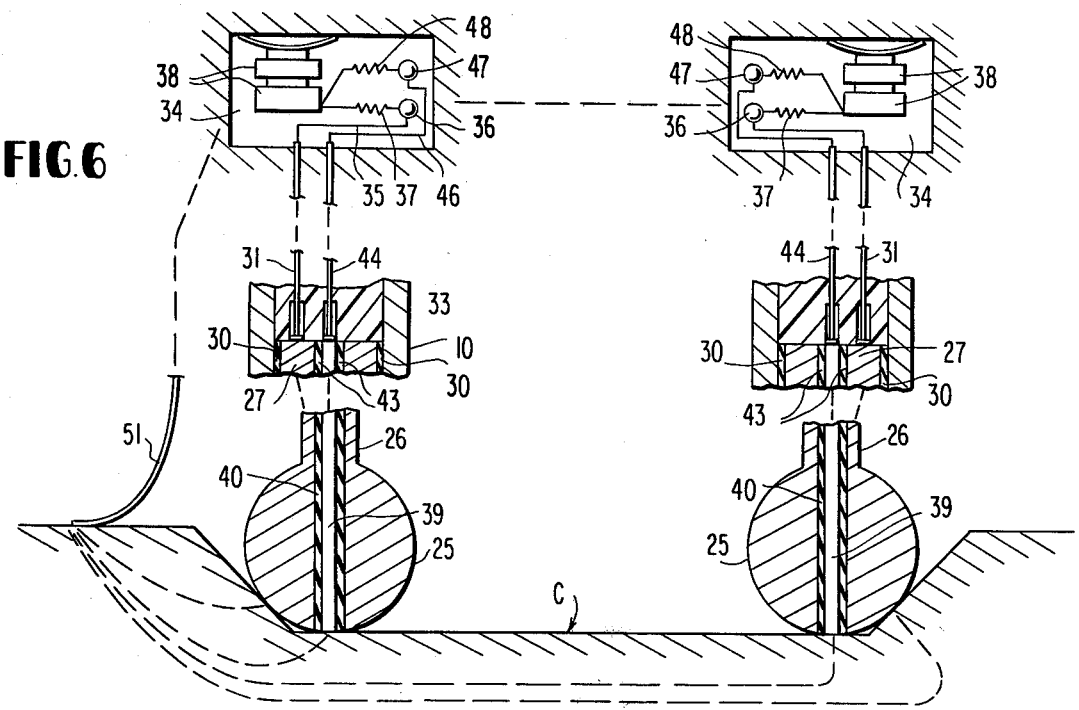
FIG. 6 is a partly schematic cross sectional view illustrating the use of the device according to one embodiment thereof.

Referring to the drawings in detail, a caliper measuring device for machined cavities having angled side walls is shown in FIG. 1 comprising caliper legs 10 which are preferably tapered at 11 near their lower extremities to facilitate entry into deep or narrow recesses. The caliper legs include enlarged opposing head portions 12 pivotally connected at 13 to a reaction block or element 14 which has a threaded bore 15 to receive a lead screw 16. An adjusting knob 17 fixed on the top of the lead screw by a set screw 18 is employed to turn the lead screw to thread it upwardly or downwardly in the threaded bore 15. A caliper leg pusher element 19 is intervened with the knob 17 and the element 14 and has opposite side converging cam faces 20 to react with upper end cam faces 21 on the two caliper legs.

The head portions 12 are recessed at 22, FIG. 2, to accommodate the reaction element 14 and to receive a pair of springs 23 which interact with the legs 10 and element 14 to bias the caliper legs toward open or spread positions. It may readily be understood that, when the adjusting knob 17 is turned counterclockwise, looking down on the top of the device, the knob, pusher 19 and lead screw 16 will travel upwardly relative to the reaction element 14 and the legs of the device will be progressively opened or separated due to the action of the springs. When the knob 17 is turned in the opposite direction, the legs will be retracted or closed. Preferably, to reduce friction, a ball bearing 24, FIG. 3, is placed between the knob 17 and the non-rotating pusher element 19. Other types of operating mechanisms for the caliper legs may be utilized under the invention.

In the embodiment shown in FIGS. 1 through 6, each leg of the caliper is fitted at its lower end with a removable or interchangeable metallic ball head contact or sensing element 25 of high precision diameter. The elements 25 can be formed in various sizes, as small as 1/16 inch in diameter up to 1 or 2 inches in diameter, depending upon requirements. Such ball elements can be made with great precision, practically with zero tolerance. As an example, the ball elements 25 may measure exactly 0.500 inch each in diameter. For simplicity of explanation, referring to FIGS. 4 and 6, with the ball elements 25 provided in this size, the machinist may be required to machine a cavity 0.500 inch deep in a 2 inch thick steel plate having an outside diameter of 8 inches and with the opposing side walls of the cavity rising from the flat floor thereof at 45° angles. The machinist may be required to produce a dimension of 5 inches±0.001 inch across the bottom or inside corners of the cavity designated C in FIG. 6.

Given the precise diameters of the ball elements 25 embodied in the calipers, all that is needed in order to measure the required critical dimension between the bottom corners of the cavity C, FIG. 6, is the distance or dimension across the two ball elements 25, namely, the outside distance. In a given situation, this distance or dimension can be calculated by the use of simple trigonometry well known to the machinist or die maker. Usually such measurements are made by the use of gage pins and gage blocks and the process is tedious. One must be extremely careful that the gage pins are touching both the floor of the cavity and the bottom terminals of the angled side walls simultaneously when measuring the distance between the pins. The present invention greatly simplifies all such measuring and renders it far more accurate and at least ten times faster than with traditional means. Not only does the invention promote precision checking of properly machined cavities and grooves but also facilitates the machining of cavities and grooves with the degree of precision required.

The ball elements 25 include stems 26 and head pieces 27 which are pivoted to the lower end portions of the legs 10 by electrically insulating cross sleeves 28 secured by screws 29. Each pivotal head piece 27 is also electrically insulated from the caliper leg 10 by insulating washers 30. The sleeve 28 is preferably formed of hard plastic to resist wear. A first electrical contact pin 31 is biased by a spring 32, FIG. 4, into sliding engagement with the metallic head piece 27 of the pivoted ball element 25. The biasing spring 32 is held within a cavity formed in an internal insulator 33 of each leg 10. The contact pin 31 or conductor rises through the particular leg 10 to a chamber 34 formed therein where it is connected through a wire 35 with a light emitting diode 36 connected through a resistor 37 with hearing aid batteries 38 also mounted in the chamber 34.

A central axial slender electrical contact pin or sensor 39 adapted to engage the floor of machined cavity C extends through an insulating sleeve 40 of each ball element 25 and stem 26, the sleeve 40 being positioned in a bore formed through the elements 25 and 26, FIG. 4. The upper end of each contact pin 39 is connected as at 41 to a metallic disc 42 separated from head portion 27 by additional insulating washers 43. Another electrical contact pin 44 extending through the internal insulator 33 of each leg 10 is biased by another spring 45 into sliding contact with the periphery of metallic disc 42, FIGS. 4 and 5. The pin or conductor 44 rises through each caliper leg, FIG. 6, to the chamber 34 and is connected in such chamber with a wire 46 connected with a second light emitting diode 47, in turn connected through a second resistor 48 to the batteries 38. It may be observed that the two light emitting diodes and their associated contact or sensor elements 25 and 39, FIG. 6, are electrically connected in parallel with the battery source 38. It may be noted here that it is also feasible to construct the caliper device for use like an electric razor with alternating house current, in lieu of internal batteries, in which case suitable transformer and rectifier means, not shown, must be provided.

As best shown in FIG. 5, the lower ends of caliper legs 10 are slotted at 49 below the insulators 33 to receive the pivoted or rotational elements 27 and 42. The screws 29 may be adjusted to regulate the tension and friction on the rotational parts. The chambers 34 for the electrical components are covered by small translucent slide plates 50 which are removable for servicing the device.

In the use of the invention according to the above-described embodiment, to check the accuracy of the dimension between the lower corners of the machined cavity C, FIG. 6, or to assist the machinist in producing such cavity to the required tolerances, the machinist or user must be able to illuminate all four of the light emitting diodes 36 and 47 simultaneously. Incidentally, the caliper device is grounded by a yielding ground contact element 51 attached to one leg 10, as illustrated. With this ground contacting the metal workpiece, the caliper legs 10 are adjusted by means of knob 17 to move the ball elements 25 into tangent contact at two points with the angled side walls of cavity C. Simultaneously, the pins 39 must be held in contact with the flat floor of the cavity C. Under these and only these conditions shown in FIG. 6 will the machinist succeed in illuminating all four diodes 36 and 47 simultaneously, thus assuring him that the required measurement has been achieved. All doubt and guesswork by the machinist is eliminated by the use of the invention.

As previously explained, the precise diameters of the ball elements 25 are known in a given case. After succeeding in illuminating the four diodes simultaneously, the machinist or user of the device now employs a micrometer to measure the distance from the outside of one ball element 25 to the outside of the other ball element. With this precise measurement, the known diameter of each ball element 25 and the known angle of each cavity side wall, by simple trigonometric calculation, the required distance between the bottom corners of the cavity can be accurately checked.

Figure 7:
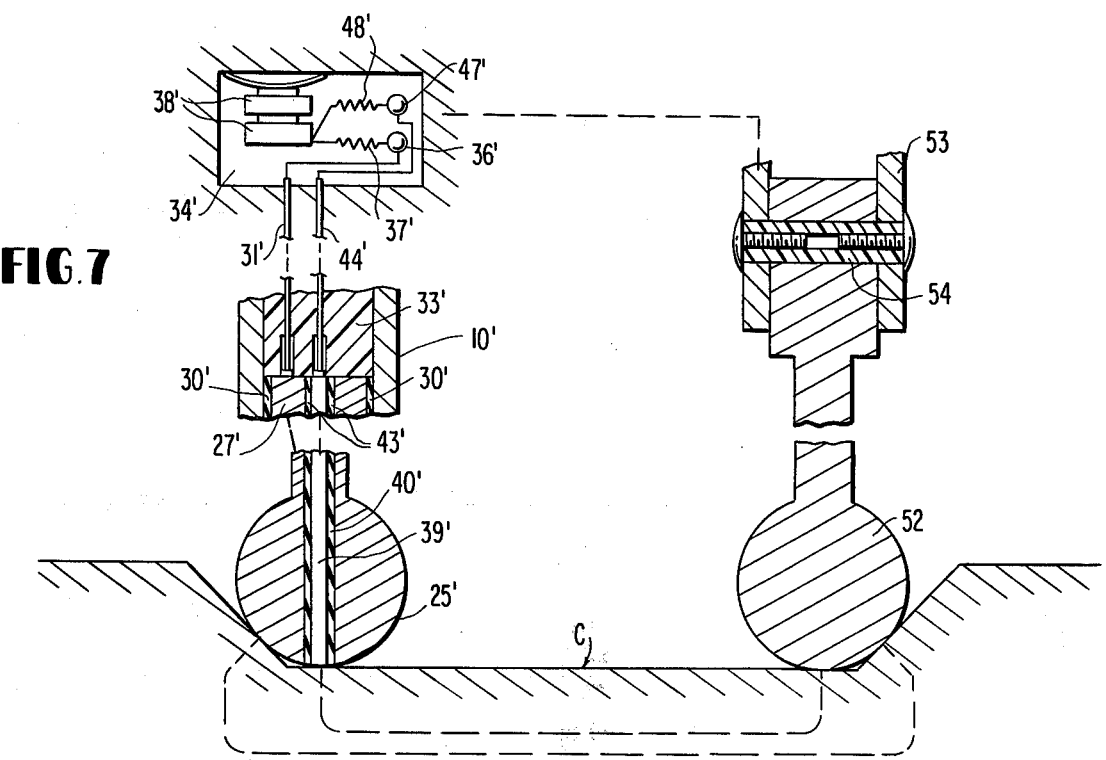
FIG. 7 is a similar view showing the use of the device according to a second embodiment.
Figure 8:
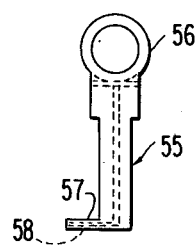
FIG. 8 is a side elevation of a right angular contact or sensor extension used for measuring grooves.
Figure 9:
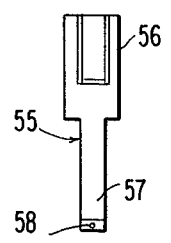
FIG. 9 is an elevational view taken at right angles to FIG. 8.

In a second embodiment of the invention shown in FIG. 7, the identical machined cavity C is illustrated.

The external grounding element 51 is eliminated and one pivoted ball contact element 52 of solid construction forms the electrical ground, as illustrated. This element 52 is precisely sized, as previously described, and is pivoted to one caliper leg 53 at 54, FIG. 7, in the manner previously described. The leg 53 contains no internal chamber for batteries, resistors and diodes but is otherwise constructed according to the previous description of leg 10.

The second caliper leg in FIG. 7 designated 10' is constructed identically to either of the previously-described legs 10 and has a chamber 34' for batteries 38' and parallel connected resistors 48' and 37' and light emitting diodes 47' and 36'. All other parts associated with the leg 10' are identical in construction to the corresponding parts described in connection with the prior embodiment. No further description of these elements is necessary.

In the use of the embodiment in FIG. 7 for checking the described critical dimension of the cavity C, the machinist places the grounding ball element 52 into tangent contact with one angled side wall and the floor of cavity C and then adjusts the caliper device in an effort to engage the sensor ball element 25' with the opposite angled side wall while maintaining the pin element 39' in contact with the floor of the cavity. Both ball elements must also contact the floor of the cavity in each embodiment of the invention. He adjusts the device by use of the knob 17 until both diodes 36' and 47' emit light and when this condition is achieved, the required measurement has been made and the machinist is now ready to place a micrometer across the two ball elements 52 and 25' prior to making the trigonometric calculation. Except for the elimination of ground element 51 and the elimination of one pair of light emitting diodes and associated electrical components, the device is constructed and operated in the same manner for both described embodiments.

To increase the range of utility of the invention, leg attachments or extensions 55 for each leg of the calipers are provided to facilitate the precise measuring of either internal or external machined grooves in a workpiece. Each leg attachment 55 has a pivot head 56 provided thereon for interchangeable engagement with the head pieces 27 of the previously-described ball elements. In other words, either form of measuring element may be employed on the legs of the caliper interchangeably. Each attachment or element 55 has a narrow L-shaped or right angle terminal 57 having an internal center electrical contact pin 58 therein and being electrically insulated from the exterior portion of the element 55, whereby the measuring calipers can be employed with the extensions 55 to measure precisely across either internal or external machined grooves in a workpiece, depending upon whether the L-shaped terminals 57 are mounted on the calipers to face outwardly or inwardly, as will be understood by those skilled in the art. The mode of operation or use of the invention when the extensions 55 are employed is generally as described in connection with the other embodiments and no further detailed description should be required. A machinist measuring an internal or external machined groove will adjust the caliper legs to bring the tips of contacts 58 simultaneously into contact with opposing grooved faces and the illumination of two light emitting diodes will enable the machinist to know that a proper measurement has been made, whereupon a micrometer may be used across the outer tips of the L-shaped terminals 57.

Another mechanical feature not previously mentioned is that the lead screw 16 is preferably equipped with a knurled fast winding extension 59.

It should also be noted that the ball or spherical elements 25, etc. may be partial spheres or half-spheres with their lower portions only spherically curved with precision to enable them to properly engage the floor and angled side walls of a machined cavity. Also the coaxial elements 39, etc. need not be straight pins and, in some instances, may be otherwise shaped but will always include contact tips exposed through the outer surfaces of elements 25 to engage the workpiece.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A precision measuring calipers for machinists and the like comprising spreadable and retractable caliper legs and means connected with the caliper legs to finely adjust their relative positions during use, a pair of conducting elements on at least one leg of the calipers in telescopically interfitting relationship and adapted for engagement with parts of a machined workpiece to be measured, the outer one of said pair of conducting elements being spherically formed with precision at least in part and the interior one of the conducting elements including a contact tip exposed through the spherical surface of the outer conducting element, the other leg of the calipers having at least a single machined workpiece engaging element thereon, said conducting elements being electrically insulated from each other and from the leg of the calipers on which they are carried, at least a pair of electrically powered light emitting elements on the calipers remotely from said conducting elements and being electrically connected with the conducting elements, and an electrical grounding means for the calipers.

2. A precision measuring calipers as defined in claim 1, and a pair of spring-urged conductors extending through the interior of the leg of the calipers carrying said conducting elements, the conducting elements being pivotally adjustably mounted on said leg and having rotating head parts in slidable contact with said spring-urged conductors.

3. A precision measuring calipers as defined in claim 2, and an insulator for said spring-urged conductors within said leg, said leg having an internal chamber remote from said conducting elements and receiving said spring-urged conductors, and said light emitting elements being disposed in said chamber and being electrically coupled with said conductors.

4. A precision measuring calipers as defined in claim 3, and battery means mounted in said chamber and electrically coupled with said light emitting elements.

5. A precision measuring calipers as defined in claim 4, and said light emitting elements comprising a pair of light emitting diodes electrically connected in parallel between said battery means and said conductors.

6. A precision measuring calipers as defined in claim 5, and resistance means coupled between the battery means and light emitting diodes.

7. A precision measuring calipers as defined in claim 1, and a pair of said conducting elements on each leg of the calipers, and two pairs of said light emitting elements on the calipers one for each pair of the conducting elements.

8. A precision measuring calipers as defined in claim 1, and said electrical grounding means comprising said single workpiece engaging element on said other leg of the calipers.

9. A precision measuring calipers as defined in claim 1, and said pair of interfitting conducting elements comprising a precision sized metallic ball element having a central bore, an insulating sleeve within said bore, a coaxial pin conducting element within the insulating sleeve and having a leading contact tip exposed through the exterior surface of said ball element, and means forming an electrically insulated pivotal connection between the interfitting conducting elements and the leg of the calipers carrying said conducting elements.

10. A precision measuring calipers as defined in claim 9, and said leg being slotted in its leading end, said last-named means extending across the slot of the leg, rotational disc heads on said metallic ball element and pin conducting element within said slot and being apertured to receive said means pivotally, and a pair of spring-urged conductors within said leg and having wiping electrical engagement with the peripheral faces of said disc heads.

11. A precision measuring calipers as defined in claim 1, and said means to finely adjust the relative positions of said caliper legs comprising a turnable lead screw, a reaction element between said legs and pivoted thereto and threadedly engaged with the lead screw, a leg pusher intervened with cam portions of the legs and a turning knob on the lead screw and having coacting cam parts slidably engaging the cam portions of the legs, and biasing springs engaging the legs and reaction element and urging the legs toward spread apart positions.

12. A precision measuring calipers as defined in claim 1, and said pair of conducting elements on said one leg being detachably mounted on said leg, and another pair of conducting elements mountable on said one leg interchangeably with the first-named pair and being of right angular configuration and narrow to facilitate precision measuring of machined grooves with said calipers.

13. A precision measuring calipers as defined in claim 12, and said pair of conducting elements of right angular configuration including a narrow internal pin element and means insulating the pin element from the body surrounding it.

* * * * *